United States Patent [19]

Lorenz et al.

[11] Patent Number: 4,628,082
[45] Date of Patent: Dec. 9, 1986

[54] DERIVATIVES OF AZOBARBITURIC ACID OR SALTS OR COMPLEXES THEREOF

[75] Inventors: Manfred Lorenz, Cologne; Karl H. Schündehütte, Leverkusen, both of Fed. Rep. of Germany

[73] Assignee: Bayer Aktiengesellschaft, Leverkusen, Fed. Rep. of Germany

[21] Appl. No.: 734,364

[22] Filed: May 14, 1985

Related U.S. Application Data

[63] Continuation of Ser. No. 670,433, Nov. 9, 1984, abandoned, which is a continuation of Ser. No. 408,346, Aug. 16, 1982, abandoned.

[30] Foreign Application Priority Data

Sep. 2, 1981 [DE] Fed. Rep. of Germany ....... 3134725
Apr. 29, 1982 [DE] Fed. Rep. of Germany ....... 3215875

[51] Int. Cl.$^4$ .................... C09B 29/036; C09B 29/52; C09B 45/14; C09B 45/22
[52] U.S. Cl. ...................... 534/707; 106/23; 106/288 Q; 106/308 Q; 106/309; 534/573; 534/577; 534/581; 534/705; 534/737; 534/738; 534/767; 534/768; 534/693; 534/728
[58] Field of Search .............. 534/707, 737, 767, 738, 534/573, 577, 705, 768, 693, 728; 106/288 Q, 308 Q

[56] References Cited

U.S. PATENT DOCUMENTS

| | | | |
|---|---|---|---|
| 3,862,116 | 1/1975 | Toji | 260/154 |
| 3,869,439 | 3/1975 | Schundehutte | 260/140 D |
| 4,285,861 | 8/1981 | Brode et al. | 260/154 |

FOREIGN PATENT DOCUMENTS

| | | | |
|---|---|---|---|
| 3130319 | 8/1973 | Australia | 534/638 |
| 2064093 | 7/1972 | Fed. Rep. of Germany | 534/638 |
| 2121048 | 8/1972 | France | 534/638 |
| 7117899 | 6/1972 | Netherlands | 534/638 |
| 1336686 | 11/1973 | United Kingdom | 534/638 |

Primary Examiner—Floyd D. Higel
Attorney, Agent, or Firm—Sprung Horn Kramer & Woods

[57] ABSTRACT

Azobarbituric acid derivatives characterized in that in their free acid form they have the following tautomeric structure are disclosed:

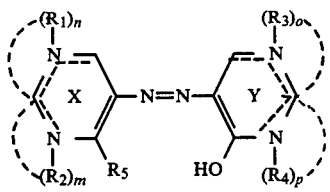

The azobarbituric acid derivatives are characterized in that X and Y rings can each carry one or two substituents from the series comprising $=O$, $=S$, $=NR_7$, $-NR_6R_7$, $-OR_6$, $-SR_6$, $-COOR_6$, $-CN$, $-CONR_6R_7$, $-SO_2R_8$,

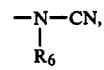

alkyl, cycloalkyl, aryl and aralkyl, the total number of the endocyclic and exocyclic double bonds for each of the rings X and Y being three.

The new azobarbituric acid derivatives are other than those of azobarbituric acid, azouracil and uracil-5-azobarbituric acid and their salts. The compounds are useful as pigments which pigments are useful for pigmented paints, in printing inks, distempers or emulsion paints, inter alia.

13 Claims, No Drawings

DERIVATIVES OF AZOBARBITURIC ACID OR SALTS OR COMPLEXES THEREOF

This is a continuation of application Ser. No. 670,433, filed Nov. 9, 1984 now abandoned, which is a continuation of Ser. No. 408,346 Filed Aug. 16, 1982, abandoned.

The invention relates to azobarbituric acid derivatives, their solid solutions, inclusion compounds and intercalation compounds, processes for preparing the new compounds and their use as pigments.

The new azobarbituric acid derivatives, in one of their tautomeric structures, correspond to the formula

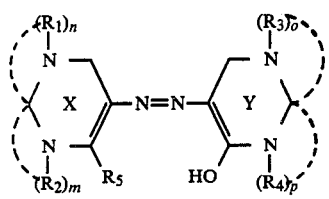

in which the rings designated

X and Y can each carry one or two substituents from the series comprising =O, =S, =NR$_7$, —NR$_6$R$_7$, —OR$_6$, —SR$_6$, —COOR$_6$, —CN, —CONR$_6$R$_7$, —SO$_2$R$_8$,

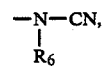

alkyl, cycloalkyl, aryl and aralkyl, the total number of the endocyclic and exocyclic double bonds for each of the rings X and Y being three, R$_6$ represents hydrogen, alkyl, cycloalkyl, aryl or aralkyl and R$_7$ represents hydrogen, cyano, alkyl, cycloalkyl, aryl, aralkyl or acyl, R$_8$ designates alkyl, cycloalkyl, aryl or aralkyl, R$_1$, R$_2$, R$_3$ and R$_4$ represent hydrogen, alkyl, cycloalkyl, aryl or aralkyl and can also, as indicated by the broken lines in the formula I, form 5- or 6-membered rings to which further rings can be fused, R$_5$ designates —OH, —NR$_6$R$_7$, alkyl, cycloalkyl, aryl or aralkyl, it being possible for the substituents mentioned for R$_1$–R$_8$ and containing CH bonds in turn to be substituted and m, n, o and p to designate 1 or, in the case where double bonds extend from the ring nitrogen atoms, as indicated by the dotted lines in the formula I, also 0 with the exception of azobarbituric acid, azouracil and uracil-5-azobarbituric acid and their salts.

The invention also relates to salts, complexes, inclusion compounds and intercalation compounds of compounds of the formula I, salts, complexes, inclusion compounds, intercalation compounds and solid solutions of azobarbituric acid and azouracil and uracil-5-azobarituric acid and their alkali metal salts being excepted.

The solid solutions or inclusion compounds contain organic and/or inorganic compounds.

The invention, except as specified, preferably relates to the following compounds or their salts, complexes, solid solutions, inclusion compounds and intercalation compounds.

1. Compounds which, in the form of their free acids, correspond to the formula I in which the ring designated X represents a ring of the formulae

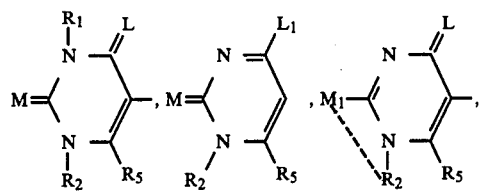

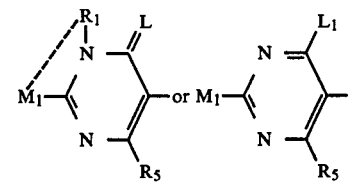

in which

L and M=O, =S or =NR$_7$,

L$_1$ designates hydrogen, —OR$_6$, —SR$_6$, —NR$_6$R$_7$, —COOR$_6$, —CONR$_6$R$_7$, —CN, alkyl, cycloalkyl, aryl or aralkyl and M$_1$ designates —OR$_6$, —SR$_6$, —NR$_6$R$_7$, —COOR$_6$, —CONR$_6$R$_7$, —CN, —SO$_2$R$_8$,

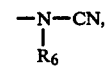

alkyl, cycloalkyl, aryl or aralkyl, it being possible for the substituents M$_1$ and R$_1$ or M$_1$ and R$_2$ to form a 5- or 6-membered ring.

2. Compounds which, in the form of their free acids, correspond to the formula I in which the ring designated Y represents a ring of the formulae

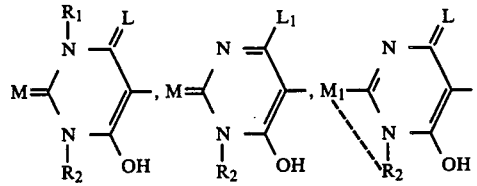

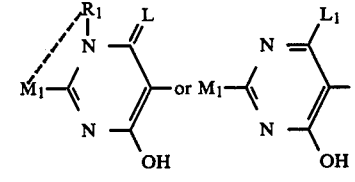

3. Compounds which, in the form of their free acids, correspond in one of their tautomeric structures to the formulae II or III

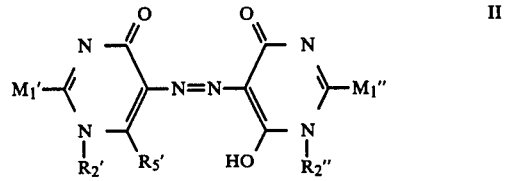

-continued

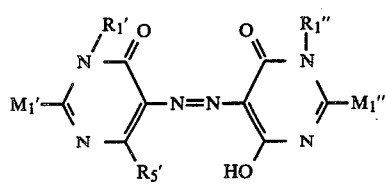

in which
R$_5'$ designates —OH or —NH$_2$,
R$_1'$, R$_1''$, R$_2'$ and R$_2''$ represent hydrogen and
M$_1'$ and M$_1''$ designate hydrogen, —OH, —NH$_2$, —NHCN, arylamino or acylamino.

Substituents within the meaning of alkyl preferably designate C$_1$-C$_6$-alkyl which can be substituted, for example by halogen, such as chlorine, bromine or fluorine, —OH, —CN, —NH$_2$ or C$_1$-C$_6$-alkoxy.

Substituents within the meaning of cycloalkyl preferably designate C$_3$-C$_7$-cycloalkyl, in particular C$_5$-C$_6$-cycloalkyl which can be substituted, for example by C$_1$-C$_6$-alkyl, C$_1$-C$_6$-alkoxy, halogen, such as Cl, Br or F, C$_1$-C$_6$-alkoxy, —OH, —CN or —NH$_2$.

Substituents within the meaning of aryl preferably designate phenyl or naphthyl, which can be substituted, for example by halogen, such as F, Cl or Br, —OH, C$_1$-C$_6$-alkyl, C$_1$-C$_6$-alkoxy, —NH$_2$, —NO$_2$ or —CN.

Substituents within the meaning of aralkyl preferably designate phenyl- or naphthyl-C$_1$-C$_4$-alkyl, which can be substituted in the aromatic radicals, for example by halogen, such as F, Cl or Br, —OH, C$_1$-C$_6$-alkyl, C$_1$-C$_6$-alkoxy, —NH$_2$, —NO$_2$ or —CN.

Substituents within the meaning of acyl preferably designate (C$_1$-C$_6$-alkyl)-carbonyl, phenylcarbonyl, C$_1$-C$_6$-alkylsulphonyl, phenylsulphonyl, carbamoyl optionally substituted by C$_1$-C$_6$-alkyl, phenyl or naphthyl, sulphamoyl optionally substituted by C$_1$-C$_6$-alkyl, phenyl or naphthyl or guanyl optionally substituted by C$_1$-C$_6$-alkyl, phenyl or naphthyl, it being possible for the alkyl radicals mentioned to be substituted, for example by halogen, such as Cl, Br or F, —OH, —CN, —NH$_2$ or C$_1$-C$_6$-alkoxy and for the phenyl and naphthyl radicals mentioned to be substituted, for example by halogen, such as F, Cl or Br, —OH, C$_1$-C$_6$-alkyl, C$_1$-C$_6$-alkoxy, —NH$_2$, —NO$_2$ or —CN.

In the case where, as indicated in the formula I by the broken lines, M$_1$R$_1$ or M$_1$R$_2$ or R$_1$, R$_2$, R$_3$ and R$_4$ form 5- or 6-membered rings, the latter preferably are triazole, imidazole, benzimidazole, pyrimidine or quinazoline ring systems.

Possible salts of compounds of the formula I are preferably the salts and complexes of mono-, di-, tri- and tetra-anions with the metals Li, Cs, Mg, Cd, Co, Al, Cr, Sn, Pb, particularly preferably Na, K, Ca, Sr, Ba, Zn, Fe, Ni, Cu or Mn.

The nickel salts or complexes and their solid solutions and inclusion compounds are of particular importance.

Cyanoiminoazobarbituric acid, which, in the form of its free acid, corresponds in one of its tautomeric forms to the formula

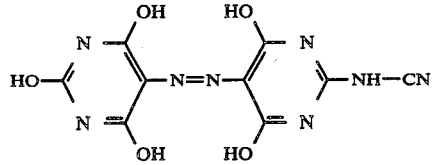

and its salts, in particular the salts of the mono- or dianion and the corresponding solid solutions and inclusion compounds, are also of particular importance within the scope of the invention.

The salts can be illustrated, for example by the following formulae:

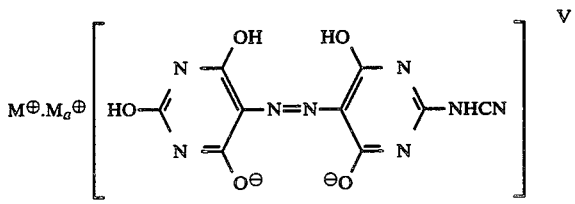

in which
M$^⊕$ and M$_a^⊕$ denote identical or different cations;

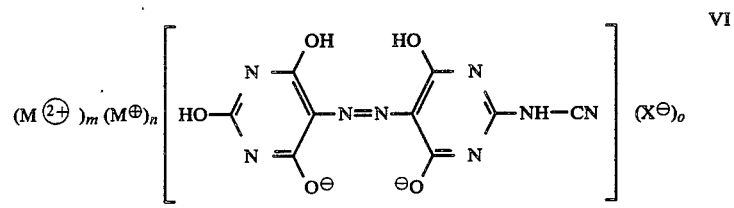

in which
M $\overset{2+}{}$ and M$^⊕$ denote cations and
X$^⊖$ denotes an anion and in which the following value combinations for m, n and o are possible:
m=1, n=0, o=0; m=2, n=0, o=2; and m=1, n=1, o=1; and in the case where o=2 the two X$^⊖$ radicals can be identical or different or can also belong to a divalent anion;

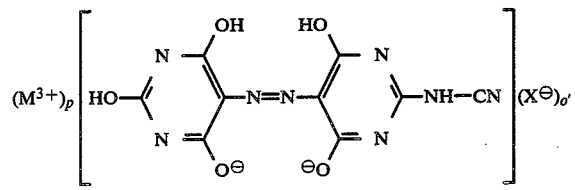

in which
M$^⊖$, M $\overset{2+}{}$ and M $\overset{3+}{}$ designate cations and
X$^⊖$ designates an anion and in which the following value combinations are possible for
n', m', p and o': n'=0, m'=0, p=2, o'=4; n'=0, m'=0, p=1, o'=1; n=1, m=0, p=1, o'=2 and n'=0, m'=1, p=1, o'=3;

and in the case where o' is 1 the $X^{\ominus}$ radicals can be identical or different or belong to a polyvalent anion.

Possible cations are preferably $H^{\oplus}$ and/or the cations of monovalent, divalent and/or trivalent metals such as Li, Cs, Na, K, Mg, Ca, Sr, Ba, Zn, Cd, Fe, Co, Ni, Cu, Al, Cr, Mn, Sn or Pb, of which K, Ca, Sr, Ba, Zn and Cd are particularly preferable.

The anionic $X^{\ominus}$ radicals are derived from organic or inorganic acids, such as formic acid, acetic acid, succinic acid, tartaric acid, hydrogen chloride, hydrogen bromide, hydrogen iodide, hydrogen fluoride, sulphuric acid, phosphoric acid or nitric acid. $X^{\ominus}$ preferably also represents the mono- or di-anion of the cyanoiminobarbituric acid of the formula I.

Salts of the formula I or II in which $M^{\oplus}$ represents $H^{\oplus}$ and $M_a^{\oplus}$ designates $K^{\oplus}$ or $M^{2+}$ designates $Ba^{2+}$, $Ca^{2+}$, $Sr^{2+}$ or $Ni^{2+}$ are preferable. The nickel salt of the formula

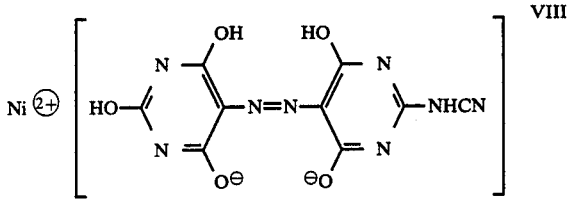

is also of particular importance.

The solid solutions, inclusion compounds or intercalation compounds are distinguished from a mixture of the components by differing, in at least one physical property, from the sum total of the properties of the components.

Considerable differences can arise, for example in solution properties. Thus, for example, the concentration of a soluble substance in a solvent will be considerably lower if the substance is present not as a pure substance but as a component of a solid solution.

For example, in the case of a sparingly soluble substance an amount of solvent which normally is sufficient for completely dissolving this substance will, in the case of the inclusion compound or solid solution, not be adequate for extraction purposes. On the other hand, it is conceivable that a solvent has such a strong affinity for the including compound that it can more or less completely displace the substance dissolved therein, and a solid solution is again formed.

An essential feature in which the solid solutions, inclusion compounds or intercalation compounds according to the invention can differ from a mixture of the components are X-ray powder diagrams, which cannot be obtained by adding the diagrams of individual components. In the simplest case the intensities of several lines change, but, as a rule, only a slight or virtually non-existent similarity with the diagrams of the individual components remains; only if one component is present in excess, will its lines appear in addition to those of the solid solution. These distinguishing features between a solid solution, an inclusion compound or an intercalation compound and a mixture are known to an expert and can be taken from the literature.

Substances which can be included in the compounds of the formula I or their salts and complexes, in particular in the nickel complexes, belong to a wide variety of compound classes. For purely practical reasons, those compounds are preferable which are liquid or solid under normal conditions.

Among the liquid substances, those are in turn preferable which have a boiling point of 100° C. or above, particularly of 150° C. and above. Suitable compounds are preferably acyclic and cyclic organic compounds, for example aliphatic and aromatic hydrocarbons, which can be further substituted, for example by OH, COOH, $NH_2$, substituted $NH_2$, $CONH_2$, substituted $CONH_2$, $SO_2NH_2$, substituted $SO_2NH$, $SO_3H$, halogen, $NO_2$, CN, $-SO_2$-alkyl, $-SO_2$-aryl, $-O$-alkyl, $-O$-aryl or $-O$-acyl.

Examples which may be mentioned in particular are paraffins and paraffin oils; triisobutylene, tetraisobutylene; mixtures of aliphatic and aromatic hydrocarbons, as obtained, for example, in the fractionation of petroleum; chlorinated paraffin hydrocarbons, such as dodecyl chloride or stearyl chloride; $C_{10}$-$C_{30}$-alcohols, such as 1-decanol, 1-dodecanol, 1-hexadecanol, 1-octadecanol and their mixtures, oleyl alcohol, 1,12-octadecanediol, fatty acids and their salts and mixtures, for example formic acid, acetic acid, dodecanoic acid, hexadecanoic acid, octadecanoic acid, oleic acid, fatty acid esters, for example the methyl esters of $C_{10}$-$C_{20}$-fatty acids, fatty acid amides, such as stearamide, stearic acid monoethanolamide or stearic acid diethanolamide, stearonitrile, fatty amines, for example dodecylamine, cetylamine, hexadecylamine, octadecylamine and others; isocyclic hydrocarbons, such as cyclododecane, decahydronaphthalene, o-, m-, p-xylene, mesitylene, dodecylbenzene mixture, tetralin, naphthalene, 1-methylnaphthalene, 2-methylnaphthalene, biphenyl, diphenylmethane, acenaphthene, fluorene, anthracene, phenanthrene, m-, p-terphenyl, o-, p-dichlorobenzene, nitrobenzene, 1-chloronaphthalene, 2-chloronaphthalene or 1-nitronaphthalene, isocyclic alcohols and phenols and their derivatives, such as benzyl alcohol, decahydro-2-naphthol or diphenyl ether, sulphones, for example diphenyl sulphone, methyl phenyl sulphone or 4,4'-bis-2-hydroxyethoxydiphenyl sulphone, isocyclic carboxylic acids and their derivatives, such as benzoic acid, 3-nitrobenzoic acid, cinnamic acid, 1-naphthalenecarboxylic acid, phthalic acid, dibutyl phthalate, dioctyl phthalate, tetrachlorophthalic acid, 2-nitrobenzamide, 3-nitrobenzamide, 4-nitrobenzamide or 4-chlorobenzamide, sulphonic acids, such as 2,5-dichlorobenzenesulphonic acid, 3- or 4-nitrobenzenesulphonic acid, 2,4-dimethylbenzenesulphonic acid, 1- and 2-naphthalenesulphonic acid, 5-nitro-1- and 5-nitro-2-naphthalenesulphonic acid, di-sec.-butylnaphthalenesulphonic acid mixture, biphenyl-4-sulphonic acid, 1,4-, 1,5-, 2,6- or 2,7-naphthalenedisulphonic acid, 3-nitro-1,5-naphthalenedisulphonic acid, anthraquinone-1-sulphonic acid, anthraquinone-2-sulphonic acid, diphenyl-4,4'-disulphonic acid or 1,3,6-naphthalenetrisulphonic acid and the salts of the abovementioned sulphonic acids, for example the sodium, potassium, calcium, zinc, nickel and copper salts; sulphonamides, such as benzosulphonamide, 2-, 3- and 4-nitrobenzenesulphonamide, 2-, 3- and 4-chlorobenzenesulphonamide, 4-methoxybenzenesulphonamide, 3,3'-sulphonylbisbenzenesulphonamide, 4,4'-oxybisbenzenesulphonamide and 1- and 2-naphthalenesulphonamide. Carboxamides and sulphonamides are a preferable group of compounds to be included.

Examples of compounds which are also particularly suitable are urea and substituted ureas, such as phenylurea, dodecylurea and others, and heterocyclic compounds, such as barbituric acid, benzimidazolone, benzimidazolone-5-sulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine and cyanuric acid.

Preferable solid solutions and intercalation or inclusion compounds contain surface-active compounds, in particular surfactants, which are described, for example, in K. Lindner, Tenside-Textilhilfsmittel-Waschrohstoffe [Surfactants-Textile Auxiliaries-Detergent Bases], 2nd edition, Volume I, Wissenschaftliche Verlagsgesellschaft mbH, Stuttgart, 1964. These compounds can be anionic, non-ionic or cationic compounds or ampholytes. Examples of suitable anionic compounds are genuine soaps, salts of aminocarboxylic acids, salts of lower or higher acylated aminocarboxylic acids, fatty acid sulphates, sulphates of fatty acid esters, amides and the like, primary alkyl sulphates, sulphates of oxo alcohols, secondary alkyl sulphates, sulphates of esterified or etherified polyoxy compounds, sulphates of substituted polyglycol ethers (sulphated ethylene oxide adducts), sulphates of acylated or alkylated alkanolamines, sulphonates of fatty acids, their esters, amides and the like, primary alkylsulphonates, secondary alkylsulphonates, alkylsulphonates having acyls bonded ester-like, alkyl ether sulphonates, alkyl phenyl ether sulphonates, sulphonates of polycarboxylic acid esters, alkylbenzenesulphonates, alkylnaphthalenesulphonates, fatty aromatic sulphonates, alkylbenzimidazole sulphonates, phosphates, polyphosphates, phosphonates, phosphinates, thiosulphates, hydrosulphites, sulphinates and persulphates. Examples of suitable non-ionic compounds are esters and ethers of polyalcohols, alkylpolyglycol ethers, acylpolyglycol ethers, alkylarylpolyglycol ethers and acylated or alkylated alkanolaminepolyglycol ethers. Examples of suitable cationic compounds are alkylamine salts, quaternary ammonium salts, alkylpyridinium salts, simple and quaternary imidazoline salts, alkyldiamines, alkylpolyamines, acyldiamines, acylpolyamines, acylalkanolamines, alkanolamine esters, alkyl—$OCH_2$—N—pyridinium salts, alkyl—CO—NH—$CH_2$—N—pyridinium salts, alkylethyleneureas, sulphonium compounds, phosphonium compounds, arsonium compounds, alkylguanidines and acylbiguanidides. Examples of suitable ampholytes are alkylbetaines, sulphobetaines and aminocarboxylic acids.

Particularly preferable solid solutions and intercalation or inclusion compounds contain non-ionic surfactants, in particular ethylene oxide addition products of fatty alcohols, fatty acids, fatty amines and of octylphenol and nonylphenol.

Another important group of compounds which, with compounds of the formula I or their salts and complexes, in particular the Ni complexes, form solid solutions and intercalation or inclusion compounds are natural resins and resin acids, such as, for example, abietic acid and its conversion products and salts. Examples of these conversion products are hydrogenated, dehydrogenated and disproportionated abietic acids. The latter can also be dimerised, polymerised or modified by addition of maleic anhydride and fumaric acid. Of interest are also resin acids modified at the carboxyl group, such as, for example, the methyl, hydroxyethyl, glycol, glycerol or pentaerythritol esters, and resin acid nitriles and resin acid amines and dehydroabietyl alcohol.

Polymers, preferably water-soluble polymers, for example ethylene/propylene oxide block polymers, polyvinyl alcohol, polyacrylic acids or modified celluloses, such as carboxymethylcelluloses, hydroxyethylcelluloses, hydroxypropylcelluloses, methylhydroxyethylcelluloses or ethylhydroxyethylcelluloses, are also suitable for embedding.

Of very particular importance are solid solutions and inclusion or intercalation compounds in which dyestuffs or dyestuff mixtures have been incorporated into the molecular skeleton of compounds of the formula I or their salts, since special effects, such as, for example, higher tinctorial strength or other hues, can thereby be obtained. The dyestuffs can belong to a wide variety of dyestuff classes. Possible examples are azo dyestuffs, anthraquinone dyestuffs, quinophthalone dyestuffs, azomethines, phthalocyanine dyestuffs and triphenylmethane dyestuffs.

Monoazo and disazo dyestuffs having 1–3 sulpho groups, in particular coupling products of naphtholsulphonic or naphthylaminesulphonic acids, are preferably used.

The amount of substance which can be embedded in the crystal lattice of compounds of the formula I or their salts, to form a solid solution or an inclusion or intercalation compound, is, as a rule, between 60% and 120% by weight, relative to the amount of host compound. This amount of substance is the substance which cannot be washed out by suitable solvents and which is inferred from elemental analysis. It is of course also possible to add more or less than the amount of substance mentioned and, if appropriate, washing out of an excess can be dispensed with. The amounts are preferably between 10 and 150%.

Compounds according to the formula I can be prepared by reacting a pyrimidine derivative which is unsubstituted in the "5"-position with a 5-diazopyrimidine derivative under suitable conditions, the two components being so chosen that the resulting substitution pattern corresponds to the formula I.

5-Diazopyrimidines which are suitable as starting products have been described in the literature or can be prepared by methods described in the literature. Preparation methods have been summarised, for example, by M. Regitz in S. Patai, "The Chemistry of Diazonium and Diazo Groups", Part 2, John Wiley & Sons, 1978, page 751.

Examples of preferable preparation methods are the reaction of a 5-aminopyrimidine or 5-sulphaminopyrimidine derivative with nitrous acid and the so-called azo group transfer, in which an azo group is transferred from an arylsulphonylamide to a CH-acidic pyrimidine derivative which is unsubstituted in the 5-position. Suitable examples of starting products for this preparation method are the following pyrimidine derivatives: barbituric acid or its derivatives such as 2-amino-, 2-cyanoamino-, 2- ureido-, 2-acetylamino-, 2-benzoylamino-, 2-methylsulphonylamino-, 2-guanidino-, 2-phenylsulphonylamino-, 2-anilino-, 2-(2-chloroanilino)-, 2-(3-chloroanilino)-, 2-(4-chloroanilino)-, 2-(3,4-dichloroanilino)-, 2-(2,5-dichloroanilino)-, 2-(2-nitroanilino)-, 2-(3-nitroanilino)-, 2-(4-nitroanilino)-, 2-(2-methoxyanilino)-, 2-(4-methoxyanilino)-, 2-(2-methylanilino)-, 2-(4-methylanilino)-, 2-(2,4-dimethylanilino)-, 2-benzylamino-, 2-methylamino-, 2-dimethylamino-, 2-butyl-, 2-ethyl-, 2-propyl-, 2-hexyl-, 2-benzyl- and 2-phenyl-4,6-dihydroxypyrimidine, 4,6-dihydroxypyrimidine, 1-methylbarbituric acid, 1-ethylbarbituric acid, 1-benzylbarbituric acid, 1-phenylbarbituric acid and 1-(4-chlorophenyl)-, 1-(2-chlorophenyl)-, 1-(3,4-dichlorophenyl)-, 1-(4-methylphenyl)-, 1-(2,4-dimethylphenyl)- and 1-(3-nitrophenyl)-barbituric acid, uracil and 4-benzyl-, 4-ethyl-, 4-methyl- and 4-phenyl-2,6-dihydroxypyrimidine.

The 5-diazopyrimidines accessible from these or similar pyrimidine derivatives, for example by azo group transfer or by another way, can be reacted under suitable conditions with CH-acidic pyrimidine derivatives which are unsubstituted in the 5-position to form derivatives of azobarbituric acid. Possible pyrimidine derivatives suitable for such a coupling reaction and unsubstituted in the 5-position are the same pyrimidine derivatives which can also be used as starting products for preparing 5-diazopyrimidine. Additional examples which may be listed are 4-amino-2,6-dihydroxypyrimidine, 2,4-diamino-6-hydroxypyrimidine, 4,6-diamino-2-hydroxypyrimidine, 4-amino-2-cyanoamino-6-hydroxypyrimidine, 2-phenyl-4-amino-6-hydroxypyrimidine, cytosine, orotic acid, 4-carbamoyl-2,6-dihydroxypyrimidine, 4-carboxy-6-hydroxy-2-phenylpyrimidine, 7-hydroxy-5-methyl-s-triazolo[1,5-a]pyrimidine, 2,5-dimethyl-7-hydroxy-s-triazolo[1,5-a]pyrimidine, 5,7-dihydroxy-s-triazolo[1,5-a]pyrimidine, 5,7-dihydroxy-2-methyl-s-triazolo[1,5-a]pyrimidine, 7-amino-5-hydroxy-s-triazolo[1,5-a]pyrimidine, 7-amino-5-hydroxy-2-methyl-s-triazolo[1,5-a]pyrimidine, 2,4-dihydroxypyrimidino[1,2-a]benzimidazole, 4-amino-2-hydroxypyrimido[1,2-a]benzimidazole and 2H-pyrimido[2,1-b]benzothiazole-2,4-(3H)-dione.

All pyrimidine derivatives mentioned can be used singly or as mixtures.

The coupling reaction can be carried out in various ways. Thus, for example, the 5-diazopyrimidines, after their preparation, can be first isolated and, if necessary, purified by recrystallisation or reprecipitation. However, a preferable process consists in directly—without intermediate isolation—reacting the 5-diazopyrimidines formed in the so-called azo group transfer.

The coupling reaction is preferably carried out in an aqueous medium within a weakly acid to weakly alkaline pH range, that is to say between pH about 2 and pH about 12.

If the 5-diazopyrimidine, in one of its tautomeric forms, has a hydrogen atom on one of its ring nitrogen atoms, the NH-acidity thereby brought about can have the effect that the diazopyrimidine, in the neutral to alkaline range, transforms into the less reactive anion. In this case, the pH range is preferably chosen in such a way that the diazopyrimidine is wholly or partially present in its undissociated form. On the other hand, the pyrimidine derivatives which are unsubstituted in the 5-position and serve as coupling components react particularly rapidly when wholly or partially present as anion. It follows that in many cases the maximum reaction rate lies within a certain pH range which differs from case to case and can, if appropriate, be determined by preliminary experiments.

Depending on the type of components and the pH value, the reaction time can be chosen between about one and 24 hours or even longer, and the reaction temperature can be chosen between 20° and 100° C. It can also be advantageous to work at an elevated temperature and under pressure.

The derivatives of azobarbituric acid formed in the reaction are weak to strong acids which, with suitable cations, form salts or complexes which can be derived from the mono-, di-, tri- or tetra-anions.

Examples of preferable suitable cations are the cations of alkali metals and alkaline earth metals, such as the cations of lithium, sodium, potassium, magnesium, calcium, strontium and barium, and also the cations of iron, cobalt, nickel, cadmium, manganese, zinc, aluminium, chromium and copper.

The salts or complexes can be prepared in various ways. For example, if during the coupling reaction, suitable metal salts are present, those salts or complexes of azobarbituric acids can directly form which, as a function of the pH value, can be derived from the various dissociation stages of the azobarbituric acids. However, it is also possible first to couple and then to react the reaction product, either immediately or, if necessary, after intermediate isolation and resuspension in a suitable solvent. The coupling reaction, depending on the type of components and the pH value, can either form undissociated barbituric acids or already salts, for example alkali metal salts, which can then be reacted with metal salts in a double decomposition.

The formation of the salt or complex is preferably carried out in an aqueous medium and the pH values, depending on the type of components, must be between mineral acid and alkaline. The reaction temperature can be between 0° and 100° C., preferably 30°-100° C.; the reaction times can be between a few hours at low temperatures and a few minutes at high temperatures. In addition, to obtain particularly advantageous application properties, it can be useful to heat the product longer than necessary for salt or complex formation, if appropriate even under pressure at elevated temperatures.

If, in the salt or complex formation, mixtures of metal salts are used, then, depending on the conditions, mixed salts or complexes can also be formed.

The formation of solid solutions, intercalation compounds or inclusion compounds, where additional substances are embedded in the molecular association, can be carried out in such a way that, before, during or after complex formation, the substance to be embedded or the mixture of substances is added in a suitable form to the reaction mixture and the mixture is heated between a few minutes and up to about 24 hours at temperatures between 30° and 100° C. Particularly in the case of sparingly soluble substances, it can also be advantageous here to work at elevated temperatures and under pressure. However, it is also possible to isolate the complex and to suspend the press cake or the dried substance in a suitable solvent and then to embed the desired substance in the same way.

The substances to be embedded can be added, depending on type and consistency, as solid substances, liquids, solutions, slurries, suspensions, dispersions or emulsions.

Cyanoiminoazobarbituric acid, and its salts, can be prepared in various ways:

1. Diazobarbituric acid is coupled in a weakly acid to neutral pH range with 2-cyanoiminobarbituric acid. To prepare salts according to the invention, suitable salts capable of double decomposition are added before, during or after the coupling reaction.

2. 2-Cyanoimino-5-diazobarbituric acid is coupled in a neutral to weakly acid pH range with barbituric acid. Salts according to the invention can be prepared by adding salts which are capable of double decomposition before, during or after the coupling reaction.

3. Barbituric acid and 2-cyanoiminobarbituric acid are initially introduced and coupled to each other at pH 4-8 by means of an agent which transfers azo groups. To prepare salts according to the invention, suitable salts capable of double decomposition are added before, during or after the reaction.

The processes described under 1.-3. and, in general, the processes described above for preparing substituted azobarbituric acids and their salts, complexes, solid solutions and inclusion and intercalation compounds can be carried out in aqueous, aqueous-organic or organic media, preferably at temperatures of 20°-150° C., particularly preferably 50°-100° C.

The preparation methods described can advantageously also be carried out in the presence of non-ionic, anionic, cationic or ampholytic surface-active compounds.

Examples of suitable non-ionic dispersing agents are non-ionic reaction products of ethylene oxide with fatty alcohols or nonylphenol. Suitable anionic surface-active compounds are described in K. Lindner, Tenside-Textilhilfsmittel-Waschrohstoffe [Surfactants-Textile Auxiliaries-Detergent Bases], 2nd edition, Wiss. Verlagsgesellschaft, Stuttgart, 1964, Volume I, pages 571–836, or in Ullmanns Encyklopädie der technischen Chemie [Ullmann's Encyclopedia of Industrial Chemistry], 4th edition, Verlag Chemie, Weinheim/Bergstr., 1975, Volume 10, pages 457–458.

Anionic surface-active compounds from the following classes of material are particularly suitable: fatty acid salts and sulphates, sulphates of fatty acid esters and amides, alkyl sulphates, sulphates of alkoxylated alcohols, sulphates of acylated alkanolamines, long-chain alkylsulphonates ($C_6$–$C_{20}$), fatty acid ester sulphonates, fatty acid amide sulphonates, sulphosuccinic acid esters and amides, ($C_6$–$C_{20}$-alkyl)-acyltaurides, perfluorinated alkylsulphonates, alkylbenzenesulphonates (for example of the "Marlon" range), alkylnaphthalenesulphonates, arylethersulphonates, alkylbenzimidazolesulphonates, alkoxycarboxylates, alkylmalonic acid salts, alkylsuccinic acid salts, and soaps.

Suitable cationic or ampholytic surface-active compounds belong, for example, to the following classes of material: fatty amine salts, quaternary alkylammonium salts ("Hyamin" range), alkylbenzoylammonium salts ("Zephirol" range), alkanolamine salts of ethers or esters, alkylpyridinium salts or protein ampholytes, substituted betaines and sulphobetaines of the "Tego Betain" range and substituted aminocarboxylic acids. In this way it is possible to prepare pigment formulations which contain 0.01-30% by weight, relative to the weight of the azobarbituric acid compound, preferably 1-10% by weight, of surface-active compound.

In the processes described above, laking can be completed by adding acids, in particular mineral acids such as hydrochloric, nitric or sulphuric acid, and lowering the pH value to below 2, preferably to about 1. To prepare the salts according to the invention, for example about 0.5M to about 3.0M of salts are added per mol of azobarbituric acid.

The reactions described above can be carried out not only in an aqueous medium but also in aqueous-organic or organic media. Examples of suitable organic solvents which can be present are formamide, N-methylformamide, N,N-dimethylformamide, acetamides, phosphoramides, dioxane, acetone, pyridine and its derivatives, such as the picolines, lutidines and collidine, monohydric or polyhydric alcohols, such as methanol, ethanol, isobutanol and ethylene glycol, and organic acids such as formic acid and acetic acid; solvents which are completely or partially miscible with water, or mixtures of these solvents, are thus preferably used.

Examples of suitable metal salts for preparing salts according to the invention of substituted azobarbituric acids are sodium chloride, potassium chloride, lithium chloride, lithium carbonate, caesium chloride, sodium nitrite, potassium nitrate, lithium hydroxide, sodium sulphate, potassium phosphate, magnesium chloride, magnesium sulphate, calcium chloride, calcium acetate, calcium formate, barium chloride, barium nitrate, barium acetate, barium carbonate, strontium nitrate, manganese chloride, manganese sulphate, iron(III) chloride, iron(III) nitrate, iron(II) sulphate, cobalt chloride, cobalt nitrate, cobalt sulphate, aluminium sulphate, aluminium nitrate, chromium(III) sulphate, chromium(III) nitrate, zinc chloride, zinc sulphate, zinc acetate, cadmium chloride, cadmium sulphate, cadmium nitrate, copper(II) sulphate, copper(II) chloride, copper(II) acetate, copper(II) formate, nickel chloride, nickel sulphate, nickel nitrate, nickel formate and nickel acetate.

It is also possible to use mixtures of these salts which can contain various of the metals mentioned. The use of such salt mixtures is particularly advisable for obtaining intermediate hues of the final coloured products.

Suitable agents transferring azo groups are compounds of the formula $$R\text{—}N_3 \qquad \text{VI}$$

in which

R represents an acyl radical, such as —$CONH_2$, —CO—NH—alkyl, —CON—(alkyl)$_2$, —$COOR_1$, $R_2$—$SO_2$— or a heterocyclic radical. Here $R_1$ denotes alkyl, aralkyl or aryl radicals and $R_2$ represents amino groups or alkyl, aralkyl, aryl or heterocyclic radicals. According to the invention, alkyl radicals are understood as meaning straight-chain and branched-chain, substituted and unsubstituted alkyl radicals. The amino groups can be substituted in any way desired.

Examples of azides suitable for the synthesis are carbamoyl azide, methyl azidoformate, ethyl azidoformate, dimethylaminosulphonyl azide, methylsulphonyl azide, benzylsulphonyl azide, benzenesulphonyl azide, o-toluenesulphonyl azide, m-toluenesulphonyl azide, p-toluenesulphonyl azide, 3-nitrobenzenesulphonyl azide, 2-chlorobenzenesulphonyl azide, 4-chlorobenzenesulphonyl azide and 2-azido-3-ethylbenzothiazolium tetrafluoroborate.

The preparation of 2-cyanoiminobarbituric acid is known, for example from German Patent Specification No. 158,591 (Friedländer, P. (editor): Fortschritte der Teerfabrikation und verwandter Industriezweige [Advances in Tar Production and Related Industries], Volume 7, page 633, Berlin: J. Springer 1905).

To prepare 2-cyanoimino-5-diazobarbituric acid in the form of the diazonium salt, the procedure followed is analogous to that used in the preparation of diazobarbituric acid (see, for example, M. Regitz, Liebigs Ann. Chem. 676, 101 (1964)).

The processes described produce the compounds according to the invention in good yields and in high purity.

The metal lakes according to the invention of the azobarbituric acid derivatives contain, depending on the preparation conditions, varying amounts of water of hydration. 0–6, as a rule 2–4, molecules of water are found per empirical formula.

Compounds of the formula I, or their salts and complexes, and their solid solutions and intercalation and inclusion compounds can be used as pigments. To improve the pigment properties, the compounds can be boiled in the reaction mixture, or the isolated compounds can be heated in solvents, such as toluene, xylene, 1,2-dichlorobenzene, nitrobenzene, i-butanol or i-butanol/water mixtures, at temperatures of about 80°–150° C. A particularly soft grain can be obtained in this way. They are in particular suitable for pigmenting organic materials, in particular high molecular weight organic materials.

They are also suitable in particular for pigmenting paints of any kind, for preparing printing inks, distempers or emulsion paints, and for the mass coloration of synthetic, semi-synthetic or natural macromolecular materials, such as, for example, polyvinyl chloride, polystyrene, polyamide, polyethylene or polypropylene. They can also be used for spin-dyeing natural, regenerated or synthetic fibres, such as, for example, cellulose, polyester, polycarbonate, polyacrylonitrile or polyamide fibres, and for printing textiles and paper. Finely divided, stable, aqueous pigment dispersions which can be used, for example, for pigmenting paints and emulsion paints, for colouring paper, for pigment printing textiles and for spin-dyeing viscose, can be obtained from these pigments by milling or kneading in the presence of nonionic, anionic or cationic surfactants.

The new pigments are distinguished by high tinctorial strength, great hiding power, very good light fastness properties, excellent solvent fastness properties and heat resistance.

EXAMPLE 1

(a) 25 g of benzenesulphonohydrazide, 200 ml of water, 20 ml of 10N hydrochloric acid and 1.25 g of a product of condensing stearic acid with taurine are stirred for 30 minutes. 60 g of ice are added, and 34 ml of an aqueous sodium nitrite solution containing 30 g of sodium nitrite in 100 ml of solution are then added dropwise in the course of about 30 minutes. The batch is stirred for 30 minutes, an excess of nitrite being maintained. The nitrite excess is then destroyed with a small amount of sulphamic acid, and excess acid is neutralised with about 5 ml of 10N sodium hydroxide solution (pH 4–7). An emulsion of benzenesulphonyl azide is obtained.

(b) 18.1 g of barbituric acid and 30 ml of 10N sodium hydroxide solution are added to an emulsion prepared according to 1a. The mixture is heated to 70° C. and maintained at this temperature for 2 hours. A solution or suspension of the sodium salt of diazobarbituric acid, which also contains benzenesulphonamide, is obtained.

(c) 22.5 g of 2-cyanoiminobarbituric acid and 5 g of succinic acid are added to a suspension prepared according to 1b, the mixture is briefly stirred, and the pH is then adjusted to 5.5–5.6 by means of about 7.5 ml of 10N sodium hydroxide solution. The temperature is increased to 95° C. and stirring is carried out for 6 hours, during which period the pH is maintained at a value of 5.5 and the temperature at 95° C. A suspension of the sodium salt of monocyanoiminoazobarbituric acid is formed.

(d) The pH value of a suspension prepared according to 1c is lowered with concentrated hydrochloric acid to pH 1 and the suspension is then heated for 1 hour at 95° C. The solids are then filtered off with suction at 90° C. and washed with hot water at 90° C. After the solids have been dried at 70° C. in a circulating air cabinet, 47.3 g of a compound which, in one of its possible tautomeric forms, corresponds to the following structural formula

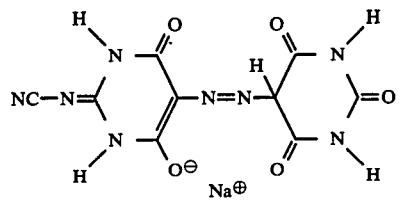

are obtained. The compound contains water of hydration, which is partially removed on more severe drying.

Analysis: (calculated for $C_9H_5N_8O_5Na.2H_2O$; molecular weight 364.2): calculated: 29.7% C, 30.7% N 6.39% Na. found: 30.8% C*, 30.6% N 6.1% Na.

*Since the last residues of contaminants (dispersing agents, excess coupling components, benzensulphonamide) can only be washed out with difficulty, the carbon value is as a rule somewhat too high.

The IR spectrum in KBr ($\mu$) displays three intensive bands at 4.55, 6.15 and 7.3.

The compound colours paints and plastics in bright orange shades.

EXAMPLE 2

If the procedure of Example 1d is used but, before the lowering of the pH value, 19.6 g of $BaCl_2.2H_2O$ are added, 55 g of a product of the formula $(C_9H_5N_8O_5)_2.Ba.xH_2O$ are obtained after analogous working up.

Analysis: (for x=4; molecular weight 819.8): calculated: 26.4% C, 27.3% N, 16.75% Ba. found: 27.4% C, 26.8% N, 16.4% Ba.

IR bands in KBr ($\mu$): 4.55, 6.1 and 7.3.

The compound colours paints in bright reddish-tinged orange shades.

EXAMPLE 3

39 g of $SrCl_2.6H_2O$ are added to a suspension of the sodium salt of monocyanoiminoazobarbituric acid and prepared according to Example 1c, the pH value is brought by means of a small amount of concentrated hydrochloric acid to 4, and the mixture is heated for 2 hours at 95° C. On working up as in Example 1d, 54.6 g of a product of the formula $(C_9H_5N_8O_5)_2.Sr.xH_2O$ are obtained.

Analysis: (for x=6; molecular weight 806.1): calculated: 26.8% C, 27.8% N, 10.9% Sr. found: 26.9% C, 26.6% N, 10.0% Sr.

IR bands in KBr ($\mu$): 4.6, 6.15 and 7.35.

The compound colours paints and plastics in yellowish-tinged orange shades.

EXAMPLE 4

A press cake prepared according to Example 1d is stirred with 500 l of water, the mixture is heated to 95° C., and 25 g of $MnCl_2.4H_2O$ are added. The solids are filtered off with suction after 5 hours at 95° C. and worked up as in Example 1. 49.7 g of the manganese salt of monocyanoiminoazobarbituric acid are obtained.

IR spectrum in KBr ($\mu$): 4.55, 6.1 and 7.3.

The compound, incorporated into an air-drying lacquer, produces bluish-tinged red shades.

EXAMPLE 5

If the manganese salt in Example 4 is replaced by an equivalent amount of ZnCl$_2$, the analogous zinc complex is obtained in a yield of 48.6 g (zinc content: 13.9%). IR spectrum in KBr ($\mu$): 4.55, 6.15 and 7.7.

The compound colours alkyd resin paints in orange shades.

EXAMPLE 6

A press cake prepared according to Example 1d and, according to its solids content, containing 45 g of the sodium salt of monocyanoiminoazobarbituric acid is stirred with 500 ml of water, and a solution of 33 g of NiCl$_2$.6H$_2$O and 21 g of trisodium citrate×5.5H$_2$O in 100 ml of water are added dropwise at 95° C. in the course of about 5 minutes. The mixture is then heated for a further 4 hours at 95° C., and the solids are then filtered off with suction and thoroughly washed with hot water. After drying at 70° C., 51.8 g of a product which gives off a further 8.2 g of water at 160° C. are obtained.

Analysis: 24.2% C, 24.0 N, 13.2 Ni.

According to this analysis, the product is a 1:1 nickel complex of monocyanoiminoazobarbituric acid which, in addition to about 16% of water, can also contain a small amount of nickel citrate.

IR spectrum in KBr ($\mu$): 4.55, 5.8, 6.3 and 7.15.

The compound colours alkyd resin paints in yellowish-brown shades.

EXAMPLE 7

If the procedure of Example 6 is followed, but 30 g of 3-nitrobenzenesulphonamide are also added to the suspension of the sodium salt, 72.3 g of a product which gives off a further 2.8% of water at 160° C. are obtained.

The IR spectrum, in addition to the bands at 4.55, 5.8, 6.3 and 7.2$\mu$, also displays bands at 6.55 and 7.4$\mu$, which are not present in the product prepared according to Example 6 and can be traced back to 3-nitrobenzenesulphonamide.

EXAMPLE 8

If the procedure of Example 6 is followed, but 40 g of the sodium salt of anthraquinone-2-sulphonic acid are also added to the suspension of the sodium salt and a solution of 50 g of NiCl$_2$.6H$_2$O and 21 g of trisodium citrate×5.5H$_2$O in 150 ml of water is added dropwise, 79.2 g of a product which gives off a further 6.8% of water at 160° C. are obtained.

The IR spectrum, in addition to the bands displayed by the compound prepared according to Example 6, also has additional bands which can be traced back to anthraquinonesulphonic acid.

EXAMPLE 9

(a) The procedure of Example 1a–1b is followed, but 22.2 g of 2-cyanoimino-4-iminobarbituric acid and 5 g of succinic acid are added to the suspension of diazobarbituric acid and the mixture is heated for 4 hours at 95° C., during which period a pH value of 5.5 is maintained with a small amount of sodium hydroxide solution. The solids are then filtered off with suction, and the press cake is thoroughly washed with boiling hot water.

(b) The press cake prepared according to 9a is stirred with 500 ml of water, the mixture is heated to 95° C., 39 g of BaCl$_2$.2H$_2$O are added and the temperature of 95° C. is maintained for a further 4 hours. The product is then filtered off with suction and washed with hot water, and the product is dried at 70° C. 50.4 g of a compound which, in one of its possible tautomeric forms, corresponds to the following formula

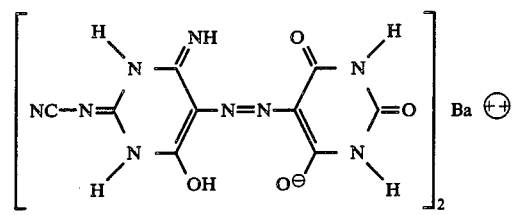

are obtained.

Analysis: ((C$_9$H$_6$N$_9$O$_4$)$_2$.Ba.xH$_2$O; calculated for x=4; molecular weight 817.9): calculated: 26.4% C, 30.8% N, 16.8% Ba. found: 27.5% C, 30.6% N, 16.5% Ba.

The substance colours alkyd resin paints in deep orange shades.

EXAMPLE 10

If the procedure of Example 9a is followed, but instead of immediately filtering off with suction 19.6 g of BaCl$_2$.2H$_2$O are first added, the mixture is heated for a further 4 hours at 95° C. at a pH value of 5.5 and the product is then isolated as in Example 9b, then 57.7 g of a substance the analysis of which produces the following values are obtained.

Analysis: 28.4% C, 28.7% N, 8.1% Ba, 4.8% Na.

The IR spectrum, apart from small deviations in the OH and fingerprint range, corresponds to the substance according to Example 9. It is a Ba/Na salt which probably also contains incorporated succinate.

The substance colours alkyd resin paints in red-orange shades.

EXAMPLE 11

If the procedure of Example 9 is followed, but an equivalent amount of strontium chloride is used instead of barium chloride, 49.5 g of the strontium salt of 2-imino-4-cyanoiminoazobarbituric acid are obtained.

Analysis: (C$_9$H$_6$N$_4$O$_4$)$_2$.Sr.xH$_2$O; calculated for x=1; molecular weight 732.1): calculated: 29.5% C, 2.2% H, 34.4% N, 12.0% Sr. found: 30.1% C, 3.0% H, 33.5% N, 12.3% Sr.

The substance colours alkyd resin paints in red-orange shades having good light fastness properties.

EXAMPLE 12

If the procedure of Example 9b is followed, but 34.5 g of NiCl$_2$.6H$_2$O are used instead of barium chloride, 52.4 g of a nickel complex of the formula C$_9$H$_6$N$_4$O$_4$.-Ni.xH$_2$O are obtained.

Analysis: (calculated for x=4; molecular weight 434): calculated: 24.9% C, 29.1% N, 13.5% Ni. found: 26.0% C, 29.1% N, 13.0% Ni.

The complex colours plasticised PVC in olive-brown shades having very good light fastness.

EXAMPLE 13

If the procedure of Example 10 is followed, but 23 g of anhydrous copper sulphate are added instead of barium chloride and the mixture is then heated for 4 hours at a pH value of 4 and at 90° C., 60.2 g of a copper complex are obtained after working up which colours alkyd resin paints in brown shades.

EXAMPLE 14

5 g of succinic acid and 18.8 g of 2-iminobarbituric acid are added to a suspension prepared according to 1b, and this mixture is heated for 8 hours at 95° C., during which period the pH value is maintained at 5.5 by means of hydrochloric acid or sodium hydroxide solution. The pH is then lowered to a value of 4 by means of 5 ml of 10N hydrochloric acid, 19.6 g of BaCl$_2$.2H$_2$O are added, and the mixture is heated for a further 1 hour at 95° C. After a customary working up, 48.7 g of a product which, in one of its tautomeric forms, is accorded the following structure:

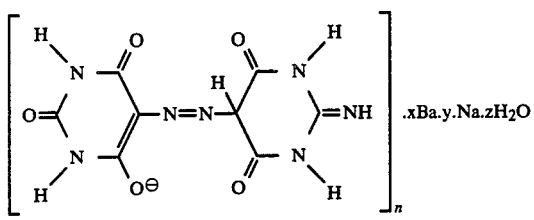

are obtained. According to the analysis the product is a mixed sodium/barium complex.

Analysis: found: 27.8% C, 26.7% N, 4.9% Ba, 4.4% Na.

The product colours alkyd resin paints in red-brown shades.

EXAMPLE 15

If the procedure of Example 14 is followed, but the same amount of 4-iminobarbituric acid is added instead of 2-iminobarbituric acid, the mixture is heated for 25 hours at 95° C. and the product then immediately isolated at pH 5.5, 40.7 g of a product which, in one of its tautomeric forms, is accorded the following probable structure:

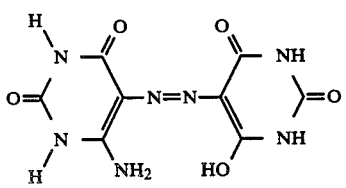

are obtained.

Analysis: C$_8$H$_7$N$_7$O$_5$; molecular weight 281.2: calculated: 34.2% C, 34.9% N. found: 34.6% C, 33.5% N.

The product colours alkyd resin paint in yellow shades.

EXAMPLE 16

(a) 26.3 g of benzenesulphonohydrazide, 100 ml of water, 21 ml of 10N hydrochloric acid and 1.3 g of Emulgator ED (a fatty alcohol/ethylene oxide addition product) are stirred for 30 minutes, 60 g of ice are added and a solution of 19.5 g of sodium nitrite in 50 ml of water is then added dropwise in the course of about 30 minutes. The batch is stirred for 30 minutes, excess nitrite is then destroyed with a small amount of sulphamic acid, and excess acid is neutralised with about 5 ml of 10N sodium hydroxide solution. An emulsion of benzenesulphonyl azide is obtained.

(b) 40 ml of 10N sodium hydroxide solution are added to an emulsion prepared according to 16 a, and 21.6 g of 2-cyanoiminobarbituric acid are then sprinkled in. The batch is heated for 3 hours at 70° C., during which period the pH value sinks from initially about 13 to about 10. A solution or suspension of 2-cyanoimino-5-diazobarbituric acid is obtained.

(c) 22.2 g of 2-cyanoimino-4-iminobarbituric acid and 5 g of glutaric acid are added to a suspension prepared according to 16 b, the pH is adjusted with 5 ml of 10N hydrochloric acid to a value of 5.5, and the mixture is stirred for 5 hours at 95° C. and pH 5.5. The pH value is then adjusted with a small amount of hydrochloric acid to 4, 39 g of BaCl$_2$.2H$_2$O are added, and the mixture is maintained for a further 5 hours at 95° C. and pH 4. On customary isolation, 66.1 g of a product are obtained which, in one of its tautomeric forms, is accorded the following probable structure:

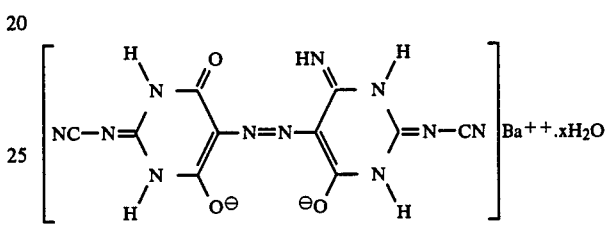

Analysis: (calculated for (C$_{10}$H$_5$N$_{11}$O$_3$) Ba.3H$_2$O; molecular weight 518.6): calculated: 23.2% C, 29.7% N, 26.5% Ba. found: 24.0% C, 29.7% N, 24.2% Ba.

The compound colours alkyd resin paints in claret shades.

EXAMPLE 17

If the procedure of Example 16 is followed, but an equivalent amount of calcium chloride is used for laking, 55.7 g of a product which contains 7.3% of calcium and has similar coloristic properties are obtained.

EXAMPLE 18

If the procedure of Example 16 is followed, but an equivalent amount of zinc chloride is used for laking, 57.9 g of the corresponding zinc salt are obtained.

Analysis: (calculated for (C$_{10}$H$_5$N$_{11}$O$_3$).Zn.3H$_2$O; molecular weight 446.7): calculated: 26.9% C, 34.5% N, 14.6% Zn. found: 27.3% C, 34.2% N, 14.7% Zn.

The compound colours alkyd resin paints and plasticised PVC in yellow-orange shades.

EXAMPLE 19

If the procedure of Example 16 is followed, but an equivalent amount of nickel chloride is added instead of barium chloride and the mixture is heated for a further 5 hours at a pH value of 3–3.3 and 95° C., 63.5 g of a nickel complex are obtained.

Analysis: (calculated for (C$_{10}$H$_5$N$_{11}$O$_3$) Ni.4H$_2$O; molecular weight 458): calculated: 26.2% C, 33.6% N, 12.8% Ni. found: 26.3% C, 32.3% N, 13.3% Ni.

The pigment colours alkyd resin paints in brown shades.

EXAMPLE 20

The procedure of Example 1a–1c is followed, but an equivalent amount of 1-(4-methoxyphenyl)-barbituric acid is added instead of cyanoiminobarbituric acid. After the customary working-up, 56.7 g of a product which, in one of its possible tautomeric forms, corresponds to the following formula:

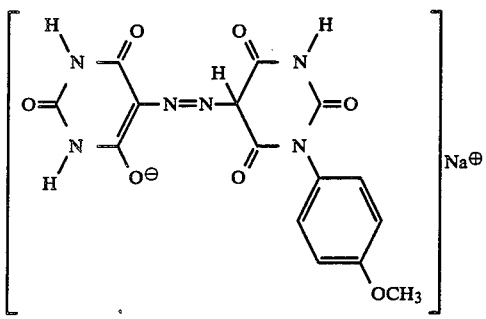

are obtained.

Analysis: (calculated for $(C_{15}H_{11}N_6O_7).Na.3H_2O$; molecular weight 464.3 calculated: 38.8% C, 18.1% N, 4.95% Na found: 39.9% C, 17.7% N, 4.8% Na.

The compound colours alkyd resin paints in red-orange shades.

EXAMPLE 21

If the procedure of Example 20 is followed, but the press cake is not dried and instead stirred again with 500 ml of water, a solution of 34.5 g of $NiCl_2.6H_2O$ and 21 g of trisodium citrate in 100 ml of water is added dropwise in the course of 5 minutes at 95° C., the mixture is maintained for a further 5 hours at 95° C. and the product isolated and dried as customary, 57.9 g of a product which colours alkyd resin paints and plasticised PVC in yellow shades are obtained.

Analysis: (calculated for $(C_{15}H_{10}N_6O_7).Ni.4H_2O)$, molecular weight 538.1 calculated: 33.5% C, 15.6% N, 10.9% Ni. found: 34.7% C, 15.7N, 11.3% Ni.

EXAMPLE 22

If nickel chloride in Example 21 is replaced by an equivalent amount of barium chloride, 59.4 g of a compound which colours alkyd resin paints in orange shades are obtained.

Analysis: (calculated for $(C_{15}H_{11}N_6O_7)_2.Ba.6H_2O$; molecular weight 1020): calculated: 35.3% C, 16.5% N, 13.5% Ba. found: 36.5% C, 16.2% N, 12.9% Ba.

EXAMPLE 23

If the procedure of Example 1a–1c is followed, but cyanoiminobarbituric acid is replaced by an equivalent amount of 2-(4-chlorophenylimino)-barbituric acid, then, after filtering off with suction and drying, 61.2 g of a product which, in one of its possible tautomeric forms, corresponds to the following formula:

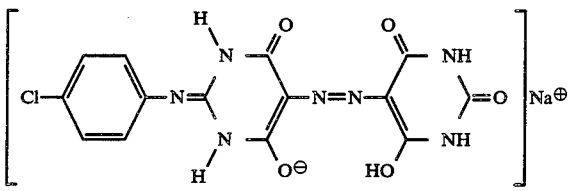

are obtained.

Analysis: (calculated for $(C_{14}H_9ClN_7O_5).Na.2H_2O$; molecular weight 449.8): calculated: 37.4% C, 21.8% N. found: 37.5% C, 20.5% N.

The compound, incorporated in alkyd resin paint, produces yellow-orange colorations.

EXAMPLE 24

If the procedure of Example 23 is followed, but the press cake is not dried and instead stirred again with 500 ml of water, the mixture heated at 95° C., 19.6 g of $BaCl_2.2H_2O$ added and the mixture again heated for 3 hours at 95° C., then, after the customary working-up, 66.5 g of a product which colours alkyd resin paints in orange shades are obtained.

Analysis: (calculated for $(C_{14}H_9ClN_7O_5)_2Ba.4H_2O$; molecular weight 990.9): calculated: 33.9% C, 19.8% N. found: 34.7% C, 19.4% N.

EXAMPLE 25

If the procedure of Example 24 is followed, but barium chloride is replaced by an equivalent amount of manganese sulphate, 56.3 g of the corresponding manganese salt, which colours alkyd resin paint in brown shades, are obtained.

Analysis: (calculated for $(C_{14}H_9ClN_7O_5)_2Mn.H_2O$; molecular weight 436.2): calculated: 38.5% C, 22.5% N, 6.3% Mn. found: 39.3% C, 21.7% N, 6.4% Mn.

EXAMPLE 26

If the procedure of Example 24 is followed, but a solution of 34.5 g of $NiCl_2.6H_2O$ and 21 g of trisodium citrate×$5.5H_2O$ in 150 ml of water is added instead of barium chloride, 59.7 g of a 1:1 nickel complex which colours alkyd resin paint in yellow-brown shades are obtained.

EXAMPLE 27

If the procedure of Example 26 is followed, but 30 g of Pluriol PE 6400 ® (commercially available ethylene oxide/propylene oxide block polymer) are additionally added before the addition of the nickel salt and the product is thoroughly washed not only with hot but also with cold water, 89.7 g of a molecular compound of the 1:1 nickel complex and Pluriol are obtained. The compound produces brighter shades than the product prepared according to Example 26.

EXAMPLE 28

(a) 22.5 of 2-cyanoiminobarbituric acid and 10 g of trisodium citrate×$5.5H_2O$ are added to a 2-cyanoimino-5-diazobarbituric acid suspension prepared according to Example 16c, and the mixture is adjusted to pH 6.8 by means of 10N hydrochloric acid and heated for 16 hours at this pH value and 95° C. The solids are then filtered off with suction and washed with hot water at 80° C. A paste of the sodium salt of 4,4'-bis-cyanoiminoazobarbituric acid is obtained.

(b) A paste prepared according to 28a is stirred with 500 ml of water, 25 g of anhydrous sodium acetate are sprinkled in and the mixture is heated to 95° C. A solution of 60 g of $NiCl_2.6H_2O$ in 200 ml of water is added dropwise in the course of 5 minutes, and the batch is heated for a further 4 hours at 95° C. After the customary working-up, 63.7 g of a product which, in one of its tautomeric forms, is accorded the following probable structure

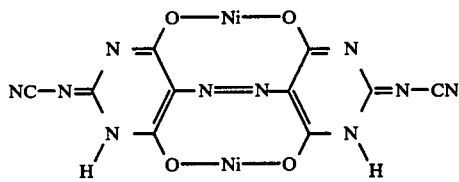

are obtained.

Analysis: (calculated for $C_{10}H_2N_{10}O_4 \cdot 2Ni \cdot 8H_2O$; molecular weight 857.7): calculated: 20.4% C, 23.8% N, 20.0% Ni. found: 20.8% C, 23.5% N, 19.1% Ni.

The compound produces in alkyd resin paints yellowish-tinged brown shades.

EXAMPLE 29

If the procedure of Example 28b is followed, but 30 g of 3-nitrobenzenesulphonamide are added to the batch before the dropwise addition of the nickel salt solution, 80.0 g of a product which predominantly consists of a molecular compound of the complex according to Example 28 and 3-nitrobenzenesulphonamide and from which only a small amount of the benzenesulphonamide can be washed out even with a large amount of hot water are obtained.

The substance colours alkyd resin paints in brighter shades than the product prepared according to Example 28.

EXAMPLE 30

19.0 g (0.1 mol) of diazobarbituric acid and 15.2 g (0.1 mol) of 2-cyanoiminobarbituric acid are stirred in 300 ml of water. 16.4 g (0.2 mol) of sodium acetate are added, and the mixture is boiled under reflux for 20 hours. 10.4 g (0.05 mol) of barium chloride are then added, and the mixture is boiled for a further 30 minutes under reflux. The pH is then lowered to a value of 1 by means of about 20 ml of 10N hydrochloric acid, and the mixture is boiled for a further 30 minutes under reflux. The solids are filtered off hot with suction and washed with 1 liter of hot water (about 90° C.).

29.9 ĝ (=73% of theory) of a pigment of the formula

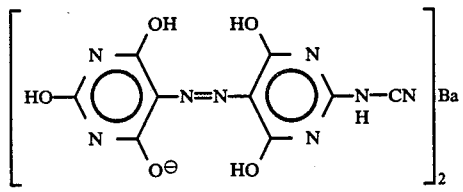

are obtained. Hue: bright reddish-tinged orange.

EXAMPLE 31

The procedure of Example 30 is followed, however, 1.0 g of stearoyl tauride are added at the start of the reaction. It is then possible to add the barium chloride after only 15 hours.

The same pigment is obtained in similar yields.

EXAMPLE 32

19.0 g (0.1 mol) of diazobarbituric acid and 15.2 g (0.1 mol) of 2-cyanoiminobarbituric acid and 16.4 g (0.2 mol) of sodium acetate are stirred in 300 l of water. 5.5 g (0.05 mol) of calcium chloride are added, and the mixture is heated for 24 hours under reflux. The pH is then lowered to a value of 1 by means of about 20 ml of 10N hydrochloric acid, and the mixture is boiled for a further 30 minutes under reflux. The solids are filtered off hot with suction and washed with 1 liter of hot water (about 90° C.).

26.9 ĝ (=64% of theory) of a pigment of the formula

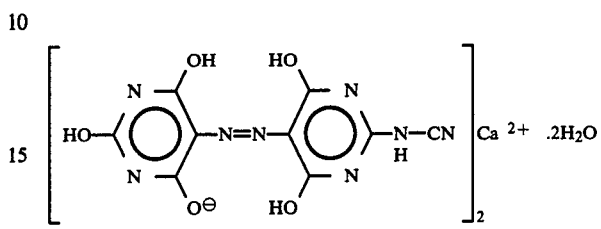

are obtained.

Hue: bright orange.

EXAMPLE 33

19.0 g (0.1 mol) of diazobarbituric acid and 15.2 g (0.1 mol) of 2-cyanoiminobarbituric acid are stirred into 300 ml of water. 16.4 g (0.2 mol) of sodium acetate are added, and the mixture is boiled under reflux for 20 hours. 7.5 g (0.1 mol) of potassium chloride are then added, and the mixture is boiled under reflux for a further 45 minutes. The mixture is then adjusted to pH 1 by means of about 20 ml of 10N hydrochloric acid and refluxed for a further 30 minutes. The solids are filtered off hot with suction and washed with 1 liter of hot water (about 90° C.).

27.9 ĝ (=69% of theory) of an orange-coloured pigment of the formula

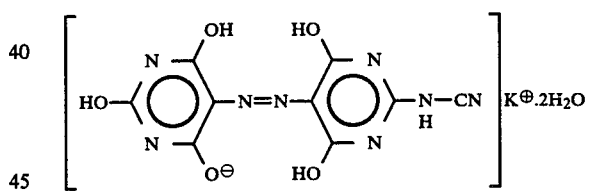

are obtained.

We claim:

1. A compound which, in the form of its free acid corresponds in one of its tautomeric structures to the formula

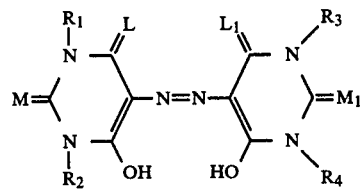

in which
$L = O$ or $NR_7$,
$L_1 = O$ or $NR_7$,
with the proviso that only one of L and $L_1$ can at the same time be $NR_7$,
one of M or $M_1 = O$ and the other is O, $NR_7$, CN or $$\begin{array}{c} \text{N}-\text{CN}, \\ | \\ \text{R}_6 \end{array}$$

$R_6$ represents hydrogen, alkyl, cycloalkyl, aryl or aralkyl and $R_7$ represents hydrogen, cyano, alkyl cycloalkyl, aryl, aralkyl or acyl which acyl is ($C_1$-$C_6$-alkyl)-carbonyl, phenylcarbonyl, $C_1$-$C_6$-alkylsulphonyl, phenylsulphonyl, carbamoyl, carbamoyl substituted by $C_1$-$C_6$-alkyl, phenyl or naphtyl, sulphamoyl, sulphamoyl substituted by $C_1$-$C_6$-alkyl, pheny or naphthyl, said alkyl radical being unsubstituted or substituted by halogen, —OH, —CN, —$NH_2$ or $C_1$-$C_6$-alkoxy, and said phenyl and naphthyl radicals being unsubstituted or substituted by halogen, —OH, $C_1$-$C_6$-alkyl, $C_1$-$C_6$-alkoxy, —$NH_2$, $NO_2$ or CN, $R_1$, $R_2$, $R_3$ and $R_4$ represent hydrogen, alkyl, cycloalkyl, aryl or aralkyl or salts or complexes of mono-, di-, tri and tetra-anions of said compound, said salts and complexes containing a metal selected from the group consisting of Li, Cs, Mg, Cd, Co, Al, Cr, Sn, Na K, Ca, Sr, Ba, Zn, Fe, Ni, Cu, Mn and Pb with the exception of azobarbituric acid and its salts and complexes.

2. A compound according to claim 1 wherein $R_6$=hydrogen and $R_7$=hydrogen.

3. A compound according to claim 1 wherein one of L or $L_1$ is =NCN.

4. A compound according to claim 1 wherein L is =NCN.

5. A compound according to claim 1 wherein $L_1$ and $M_1$ are both =O.

6. A compound according to claim 5 wherein L is =O.

7. A compound according to claim 1, wherein each of $R_1$, $R_2$, $R_3$ and $R_4$ is hydrogen.

8. A compound according to claim 1 in the form of its strontium or barium salt.

9. A compound according to claim 3 in the form of its strontium or barium salt.

10. A compound according to claim 5 in the form of its strontium or barium salt.

11. A compound according to claim 1, wherein said metal is selected from the group consisting of Na, K, Ca, Sr, Ba, Zn, Fe, Ni, Cu and Mn.

12. Cyanoiminoazobarbituric acid which, in one of its tautomeric forms, corresponds to the formula

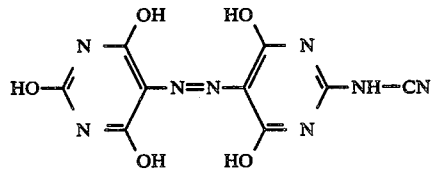

or its salts or complexes.

13. Salt of the formula

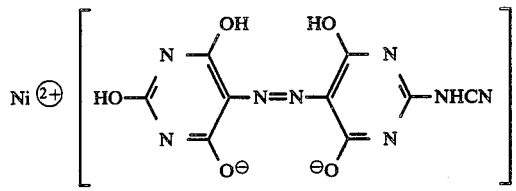

* * * * *

UNITED STATES PATENT AND TRADEMARK OFFICE
CERTIFICATE OF CORRECTION

PATENT NO. : 4,628,082
DATED : December 9, 1986
INVENTOR(S) : Manfred Lorenz, et al.

It is certified that error appears in the above-identified patent and that said Letters Patent is hereby corrected as shown below:

Col. 1, line 20     Insert dotted lines in formula as follows:

Col. 1, line 63     Correct spelling of --azobarbituric--

Col. 4, lines 63     Delete "M⊖" and substitute --M⊕--

Col. 9, lines 29-30     Delete "dihydroxypyrimido" and substitute --dihydroxypyrimidine--

Col. 10, line 10     After "if" insert --,--

Col. 14, line 61     After "500" delete "1" and substitute --ml--

Col. 17, line 60     Delete "ED" and substitute --FD--

Col. 21, line 67     After "300" delete "1" and substitute --ml--

Col. 21, line 43 and Col. 22, lines 7, 35     Delete "ĝ" and substitute --g--; same line delete --=-- and sub-

UNITED STATES PATENT AND TRADEMARK OFFICE
CERTIFICATE OF CORRECTION

PATENT NO. : 4,628,082

DATED : December 9, 1986

INVENTOR(S) : Manfred Lorenz, et al.

It is certified that error appears in the above-identified patent and that said Letters Patent is hereby corrected as shown below:

Col. 22, line 15  End of formula delete "$Ca^{2+}$ and substitute --$Ca^{2+}$--

Signed and Sealed this

Twenty-eighth Day of April, 1987

Attest:

DONALD J. QUIGG

Attesting Officer

Commissioner of Patents and Trademarks